Sept. 26, 1950    P. E. RAMSTAD ET AL    2,523,635
FLAME PEELING OF MUCILAGINOUS SEEDS
Filed July 19, 1945    2 Sheets-Sheet 2

INVENTORS:-
PAUL E. RAMSTAD
KENNETH J. YOUNG
JOHN A. ESSER

BY Arthur R. Wylie
ATTY.

Patented Sept. 26, 1950

2,523,635

UNITED STATES PATENT OFFICE 2,523,635

FLAME PEELING OF MUCILAGINOUS SEEDS

Paul E. Ramstad and Kenneth J. Young, St. Paul, and John A. Esser, Osseo, Minn., assignors to General Mills, Inc., a corporation of Delaware Application July 19, 1945, Serial No. 605,940

5 Claims. (Cl. 146—229)

1

This invention relates to a method of and apparatus for flame peeling the seed coats from mucilaginous seeds, such as guar, *Cassia occidentalis*, tara and the like, without any substantial undesirable effect on the remainder of the seed.

Flame peeling has been employed for the removal of the outer coat or skin of various fruit and vegetable materials. In general, however, it has been applied only to materials of extremely high moisture content. In such applications the moisture content of the fruit or vegetable material has sufficient heat capacity that it is relatively easy to burn or char the outer skin of the vegetable material without at the same time elevating the temperature of the main body of the vegetable material to a point at which undesirable changes occur.

Applicants have now discovered that it is possible to remove the outer seed coat from mucilaginous seeds such as those referred to above without any adverse effect on the remainder of the seed, notwithstanding the fact that these seeds are of relatively low moisture content. At the moisture content at which these seeds are ordinarily encountered in commerce, they are extremely hard and tough and the removal of the seed coat is ordinarily an extremely difficult job. It has been found, however, that it is possible to remove the seed coat by subjecting the seeds to direct contact with gases at extremely high temperatures for a controlled period of time. It is thus possible to take advantage of the low heat conductivity of the seed material to concentrate the heat almost entirely at the surface and to char the seed coat. Following the heat treatment, these seeds may be quenched in one way or other to prevent the heat from penetrating the remainder of the seed and thus cause damage.

It is therefore an object of the present invention to provide a process of removing seed coat from mucilaginous seeds by a high temperature treatment.

It is another object of the present invention to provide an apparatus whereby this method may be carried out.

Figure 1:
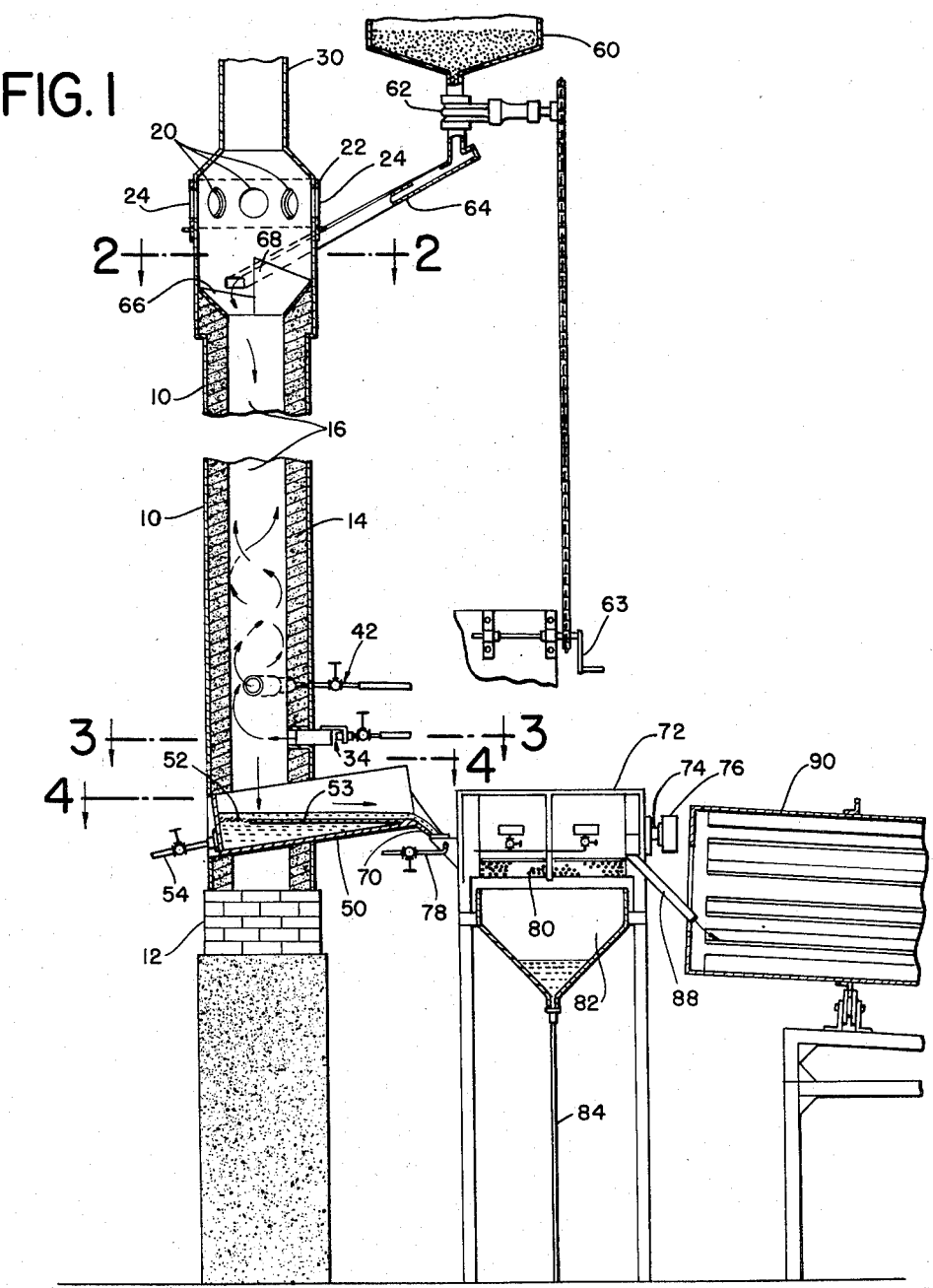
Figure 2:
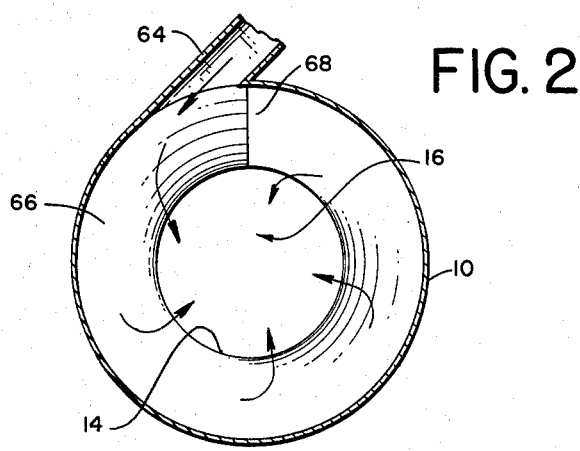
Figure 3:
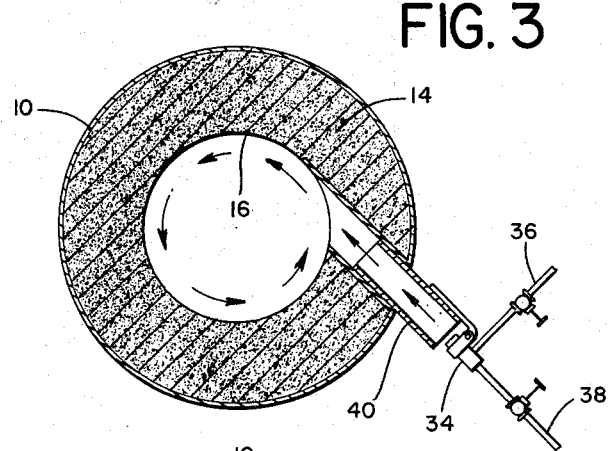
Figure 4:
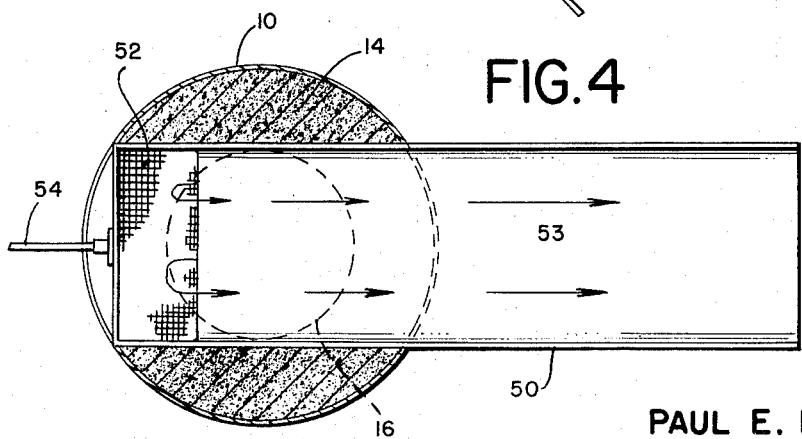

These and other objects of the invention will be more fully apparent from the following description of the invention with particular reference to the accompanying drawings in which Figure 1 is a partial side elevation of the apparatus shown partly in section; and Figs. 2, 3, and 4 are horizontal sections on the lines 2—2, 3—3, and 4—4 of Fig. 1.

2

We have found that by subjecting the seeds to an elevated temperature for a short period of time with hot gases that the seed coat may be removed without adverse effect on the remainder of the seed. In general, temperatures within the range of 1700 to 2500° F. and time periods within the range of 1 to 3 seconds have been found suitable. Higher temperatures, above 2500° F., may be used if the time period is correspondingly reduced. The higher the temperature to which the material is subjected the more quickly the seed coat can be burnt off and the less likelihood there is of heat being conducted to the body of the seed. From a commercial standpoint, temperatures within the range of 1700 to 2500° F. are obtainable conveniently and accordingly are preferred.

The heat should preferably be applied to the seeds in a uniform manner. Thus it has been found preferable to contact the seeds solely with heated gases and not to permit them to contact heated solid bodies. If part of the seed contacts a heated solid body, the seed is likely to be heated to a higher temperature at the point of contact with the solid body and accordingly at that point the seed coat is likely to be charred more quickly than the remainder of the seed coat. Such methods in which the seed contacts a solid body do result in a peeling action, though it is not as desirable as the action obtainable when the heat can be uniformly applied to the seed coat.

In view of the above it is preferred to obtain uniform heat treatment of the seed coats by contacting them as freely suspended bodies with a heat transfer medium, preferably hot gases. This may be accomplished by projecting the seeds vertically, horizontally, or in any other direction, through gases heated to the desired temperature, and allowing the contact for the required period of time. A much more convenient and more readily controllable method involves the dropping of the seed vertically through a rising stream of gases. An apparatus for carrying on the peeling in this manner is shown in the drawings.

The embodiment illustrated comprises a hollow vertical tube 10, resting on a suitable base 12, and having a fire resisting lining 14, thereby providing a hollow vertical column 16.

The top of tube 10 is provided with a series of openings 20, and around these is rotatably mounted a band 22 in which is placed a series of openings 24 of substantially the same size, shape, and arrangement as the openings 20. This band is made rotatable so as to uncover the openings 20 thereby causing them to communicate with the atmosphere. When this band is rotated about the tube from the position shown, the openings are more or less covered so that this band acts as an adjustable damper.

A stack 30 is connected to a flue or has sufficient height to provide the desired draft to carry off the products of combustion and to control the flow of gases through the tube to control the rate of falling of the seeds and thus the time of their exposure to the hot gases as will later be described.

A burner 34 (Fig 3) is supplied with oil through a pipe 36 and with compressed air through a pipe 38 and discharges through a sleeve 40 tangentially into the vertical column near its lower end. While one such burner is usually found to be enough, a second similar burner 42 (Fig. 1) may also be added if desired.

A pan 50, preferably of stainless steel, is placed at the lower end of the vertical tube 10 and extends entirely across the lower end of the hollow vertical column 16. This pan is preferably inclined upwardly toward the discharge end at the right and carries a short sieve or screen 52 at the opposite end extending entirely across the pan substantially on the level of the discharge end and firmly secured to the sides of the pan to a nearly horizontal flume 53 so as to prevent passage of seeds and the like into the water space beneath the sieve 52. A water pipe 54 supplies water to the space beneath the sieve, and this water passing up through the sieve and out over the flume provides a shallow layer of water to quench the seeds and will float them out as they fall into the pan.

Seeds to be treated are fed from a hopper 60 through a suitable valve 62 controlled from below by a crank 63 and a chute 64 tangentially onto the inclined ledge 66 at the top of the lining 14. The angle of this top is such that its inclination increases constantly from about 30° to the horizontal at the point where seeds are discharged from the chute 64 to about 60° at the point 68 thereby insuring a distribution of seeds about this inclined top as they are fed thereto.

A burner is first ignited so as to heat the vertical column and water is supplied to the pipe 54. When the column is properly heated, the valve 62 is opened thereby feeding the seeds to be treated through the chute 64. These pass spirally around the inclined ledge 66 and are distributed about the hollow vertical column as they pass downwardly therethrough. During this passage the seeds become heated so as to char the outer seed coats, and these charred seeds then drop into the water in the pan 50 thereby quenching the seeds which are then washed out by the water which is passing up through the sieve 52 and over the flume or plate 53.

These charred and quenched seeds then pass through a chute 70 to a washer 72 which may be of a well known type used for washing wheat having therein an agitator on a shaft 74 driven by a pulley 76 from any suitable source of power. This agitation in the presence of water supplied through a pipe 78 causes the charred outer coats of the seeds to be separated from the kernels and to be washed out through a perforated bottom 80 into a hopper 82 from which it is led to a drain through a pipe 84.

The peeled seeds now pass through a chute 88 to a drier 90 which may be of any suitable type.

In some cases it has been found desirable to screen the seeds for size so as to insure a more uniform charring of the seed coats. The degree of charring can also be controlled by varying the rate of falling of the seeds through the column as by varying the blast from the burner 34, or by adjusting the damper 22 which controls the draft in the stack 30. With a little experience the operator soon learns the degree of charring necessary to a successful removal of the outer seed coats of the particular variety to be treated by examining the seeds in the flume 53, and how to manipulate the above-mentioned controls to achieve this degree of charring.

With reference to the treatment of the smaller seeds of this type, such as guar, *Cassia occidentalis*, and the like, it has been found that a vertical tube 10 about 10 feet in length and about eight inches internal diameter provides a suitable contact time. With the burner 34 operating to produce a temperature of between 2000 and 2500° F. within the tube, the upward velocity of the products of combustion is such that it requires about two seconds for the seed to fall from the point of entry into the tube to the flume 53. In general, the larger the seed, the thicker the seed coat and the more prolonged or the more drastic the treatment required. This may be obtained by increasing the temperature and/or time in the tube. An increase in the time may be obtained by increasing the length of the tube 10 or the upward velocity of the gases in the tube. Suitable detailed conditions for the treatment of any particular variety of seed or of any particular batch of seed can be readily determined by a skilled operator. Seasonal and varietal differences in seed do not permit the detailed conditions of treatment to be specified with exactitude. With a knowledge of the critical factors disclosed herein, the operator can readily determine the particular conditions suitable under any given circumstances.

The water quenching of the seeds after charring has been particularly desirable as a means of preventing any undue penetration of the heat into the seed. This is particularly advantageous where washing or scouring with water is employed. However, it is desired to point out that other means of quenching such as, cold blasts of inert gas, contact with cooled surfaces, etc., may be employed. Moreover, wet scouring may be supplanted by dry scouring methods well known in the art. Wet scouring has the advantage, however, in that any particles of seed coat not sufficiently charred for removal by dry scouring may be removed by the action of the water seeping under the seed coat to loosen it and make it removable by the scouring action.

Thus it will be seen that we have provided a very simple and efficient method of, and means for peeling seeds of the type described.

While we have shown and described but a few embodiments of this invention it is to be understood that it is capable of many modifications particularly to adapt it for use on seeds of different size, thickness, and composition of outer coat and the like. Changes, therefore, may be made without departing from the spirit and scope of the invention as defined in the appended claims.

We claim as our invention:

1. Apparatus for flame peeling of seed of the class described comprising a hollow vertical column, means for directing a column of flame and heated air upwardly therethrough, means for feeding the seeds downwardly by a free fall through said hollow column, including a funnel-shaped upper ledge on the walls of the hollow vertical column and a chute discharging seeds tangentially onto this ledge, the slope of this ledge increasing as the seeds pass around the ledge from the chute, and means for suddenly quenching the seed when it has passed through said column.

2. Apparatus for flame peeling of seed of the class described comprising a hollow vertical column, means for directing a column of heated air upwardly therethrough, means for feeding the seeds downwardly by a free fall through said hollow column, including a funnel-shaped upper ledge on the walls of the hollow vertical column and a chute discharging seeds tangentially onto this ledge, the slope of this ledge increasing as the seeds pass around the ledge from the chute, a trough at the bottom of the hollow vertical column, a substantially horizontal screen in said trough, and means for supplying a stream of water to said trough, so as to maintain a water level above said screen, the stream of water carrying off the seeds as they fall into the water.

3. Apparatus for flame peeling of seed of the class described comprising a hollow vertical column, means for directing a column of heated air upwardly therethrough, means for feeding the seeds downwardly by a free fall through said hollow column, a trough at the bottom of the hollow vertical column, a substantially horizontal screen at the rear of said trough, a flume at the forward end of said trough on the same level as said screen, and means for supplying a stream of water to said trough beneath said screen so as to maintain a water level above said screen, the stream of water carrying the seeds off said flume as they fall into the water.

4. The method of peeling guar seeds which comprises forming a column of ascending hot gases having a temperature within the range of 1700–2500° F., passing said seeds freely falling downwardly through said column of hot gases, and relatively uniformly distributed across said column, the time period of contact of said seeds with said ascending column of hot gases being within the range of from 1 to 3 seconds to char the seed coat without adversely affecting the endosperm, immediately thereafter quenching the charred seeds in water, agitating the seeds in water to remove the charred seed coat, and drying the peeled seeds.

5. The method of peeling seeds selected from the groups consisting of guar, *Cassia occidentalis* and tara, which comprises forming a column of ascending hot gases having a temperature within the range of 1700–2500° F., passing said seeds freely falling downwardly through said column of hot gases, and relatively uniformly distributed across said column, the time period of contact of said seeds with said ascending column of hot gases being within the range of from 1 to 3 seconds to char the seed coat without adversely affecting the endosperm, immediately thereafter quenching the charred seeds in water, agitating the seeds in water to remove the charred seed coat, and drying the peeled seeds.

PAUL E. RAMSTAD.
KENNETH J. YOUNG.
JOHN A. ESSER.

REFERENCES CITED

The following references are of record in the file of this patent:

UNITED STATES PATENTS

| Number | Name | Date |
| --- | --- | --- |
| 80,593 | Brown | Aug. 4, 1868 |
| 328,032 | Hill | Oct. 13, 1885 |
| 822,478 | Rood | June 5, 1906 |
| 1,236,690 | Dunkley | Aug. 14, 1917 |
| 1,374,657 | Hiller | Apr. 12, 1921 |
| 1,380,859 | Baker, Jr., et al. | June 7, 1921 |
| 1,438,467 | Walden | Dec. 12, 1922 |
| 1,756,497 | Warren | Apr. 29, 1930 |
| 1,948,884 | Patterson | Feb. 27, 1934 |
| 1,984,237 | Southan | Dec. 11, 1934 |
| 2,261,560 | Pellas et al. | Nov. 4, 1941 |

FOREIGN PATENTS

| Number | Country | Date |
| --- | --- | --- |
| 546,149 | Great Britain | June 30, 1942 |